(12) United States Patent
Ohmura et al.

(10) Patent No.: US 6,617,363 B2
(45) Date of Patent: Sep. 9, 2003

(54) METHOD OF PRODUCING THERMALLY EXPANSIVE MICROCAPSULE

(75) Inventors: Takahiro Ohmura, Shinnanyo (JP); Yasushi Nakata, Osaka (JP); Yasuhiro Kawaguchi, Shinnanyo (JP)

(73) Assignees: Sekisui Chemical Co., Ltd., Osaka (JP); Tokuyama Sekisui Co., Ltd., Shinnanyo (JP)

(*) Notice: Subject to any disclaimer, the term of this patent is extended or adjusted under 35 U.S.C. 154(b) by 0 days.

(21) Appl. No.: 10/052,701

(22) Filed: Jan. 17, 2002

(65) Prior Publication Data

US 2002/0135084 A1 Sep. 26, 2002

(30) Foreign Application Priority Data

Jan. 18, 2001 (JP) ........................................ 2001-010197

(51) Int. Cl.$^7$ .............................. C08J 9/20; B01J 13/02
(52) U.S. Cl. ........................................... 521/56; 521/59
(58) Field of Search ............................................ 521/56

(56) References Cited

U.S. PATENT DOCUMENTS 3,615,972 A * 10/1971 Morehouse, Jr. et al.

* cited by examiner

*Primary Examiner*—Morton Foelak
(74) *Attorney, Agent, or Firm*—Frishauf, Holtz, Goodman & Chick, P.C.

(57) ABSTRACT

A method of producing a thermally expansive microcapsule that is excellent in heat resistance and solvent resistance, narrow in breadth of the distribution of particle size, and extremely low in secondary cohesion of the particles when heated, wherein a polymer obtained from the component comprising not less than 80 weight % of monomer of nitrile series, less than weight % of monomer of non-nitrile series, and 0.05–1 weight % of at least tetrafunctional cross-linking agent and/or of long side chain of cross-linking agent is used to micro-encapsulate a volatile expanding agent that comes into its gaseous state at a temperature equal to or less than a softening point of the polymer.

6 Claims, No Drawings

METHOD OF PRODUCING THERMALLY EXPANSIVE MICROCAPSULE

BACKGROUND OF THE INVENTION

1. Field of the Invention

The present invention relates to a method of producing a thermally expansive microcapsule which is particularly excellent both in heat resistance and in solvent resistance and also is extremely low in secondary cohesion when heated.

2. Prior Art

For example, Japanese Patent Publication No, Sho 42(1967)-26524 teaches the method that a thermoplastic polymer is used to micro-encapsulate a volatile expanding agent that comes into its gaseous state at a temperature of equal to or less than a softening point of the thermoplastic polymer, to thereby produce a thermally expansive microcapsule. This publication discloses the method that a foaming agent, such as a low-boiling aliphatic hydrocarbon, is added to a monomer; then, an oil-soluble catalytic agent is incorporated into the monomeric mixture thus obtained; and then, the resultant monomeric mixture is added into a dispersion-agent-containing aqueous dispersion medium with stirring, to be suspended for polymerization, to thereby produce spherical particles including the foaming agent.

However, this method fails to produce the thermally expansive microcapsule having excellent heat resistance and solvent resistance, providing the disadvantage that the micro-capsule is foamed and expanded at low temperature (about 80° C. to about 130° C.) and its expansion ratio is deteriorated at high temperature and long time.

On the other hand, Japanese Patent Publication No. Hei 5(1993)-15499 describes the method of producing a thermally expansive microcapsule wherein a polymer obtained from the component comprising 80–97 weight % of monomer of nitrile series, 20–3 weight % of monomer of non-nitrile series, and 0.1–1 weight % of trifunctional cross-linking agent is used to micro-encapsulate a volatile expanding agent. The thermally expansive microcapsule obtained by this method is superior both in heat resistance in that it is not foamed at temperature of 140° C. or less and in solvent resistance to the conventional one, but it still has the disadvantage of being high in secondary cohesion when heated. Because of this, when the thermally expansive microcapsule is applied, for example, to wallpaper, the wallpaper is indicated as providing a poor aesthetic design. Thus, there is still room for improvement in this method.

SUMMARY OF THE INVENTION

It is the object of the present invention to provide a method of producing a thermally expansive microcapsule that is excellent in heat resistance and solvent resistance, narrow in breadth of the distribution of particle size, and extremely low in secondary cohesion of the particles when heated.

The present invention is directed to a novel method of producing a thermally expansive microcapsule, wherein a polymer obtained from the component comprising not less than 80 weight % of monomer of nitrile series, less than 19.95 weight % of monomer of non-nitrile series, and 0.05–1 weight % of at least tetrafunctional cross-linking agent and/or of long side chain of cross-linking agent is used to micro-encapsulate a volatile expanding agent that comes into its gaseous state at a temperature equal to or less than a softening point of the polymer.

The monomers of nitrile series that may be used in the present invention include, for example, acrylonitrile, methacrylonitrile, á-chloroacrylonitrile, á-ethoxyacrylonitrile, fumaronitrile, or any mixtures thereof. Particularly preferable are acrylonitrile and methacrylonitrile. The amount of monomer of nitrile series used is not less than 80 weight % of the total amount of monomers. The amount of less than 80 weight % of monomer of nitrile series used cannot provide the intended objectives of the solvent resistance and the expandability at high temperature. Further preferably, 90–97 weight % of monomer of nitrile series is used. The monomer of non-nitrile series is selected from the group consisting of acrylic esters including methyl acrylate, ethyl acrylate, butyl acrylate and dicyclopentenyl acrylate, and methacrylic esters including methyl methacrylate, ethyl methacrylate, butyl methacrylate and isobornyl methacrylate. Particularly preferable are methyl methacrylate, ethyl methacrylate and methyl acrylate. The amount of monomer of non-nitrile series used is less than 19.95 weight % or preferably 9.8–3 weight %.

It is a characteristic feature of the present invention that at least tetrafunctional cross-linking agent and/or long side chain of cross-linking agent is used as a cross-linking agent. It is expected that the use of those cross-linking agents provides an improved cross-linking efficiency, so that when heated, the particles can be prevented from becoming sticky all over them, without detriment to their expansibility, to prevent the secondary cohesion of the particles. The at least tetrafunctional cross-linking agents that may be used include, for example, pentaerythritol tetraacrylate, pentaerythritol tetramethacrylate, dipentaerythritol hexaacrylate and dipentaerythritol hexamethacrylate. The long side chain of cross-linking agents that may be used include, for example, polyethylene glycol (PEG #200) diacrylate of number average molecular weight of 200, polyethylene glycol (PEG#400) diacrylate of number average molecular weight of 400, polyethylene glycol (PEG #600) diacrylate of number average molecular weight of 600, neopenthylglycol diacrylate, 1,6-hexanediol diacrylate, 1,9-nonanediol diacrylate, dimethylol-tricyclodecane diacrylate, ethylene oxide modified trimethylolpropane triacrylate, polyethylene glycol (PEG #200) dimethacrylate of number average molecular weight of 200, polyethylene glycol (PEG #400) dimethacrylate of number average molecular weight of 400 and polyethylene glycol (PEG #600) dimethacrylate of number average molecular weight of 600.

For the application to wallpaper, the polymer of the thermally expansive microcapsule according to the present invention may be prepared by further blending a polymerization initiator in the components recited above in an adequate proportion, if desired. No particular limitation is imposed to the polymerization initiator. Although the polymerization initiators that are in common use in the relevant field may be used, an oil-soluble polymerization initiator which is soluble in a polymerizable monomer used is preferably used. For example, dialkyl peroxide, diacyl peroxide, peroxy diester, peroxy dicarbonate and azo compound can be cited. To be more specific, dialkyl peroxides including methyl ethyl peroxide, di-t-butyl-peroxide and dicumyl peroxide; diacyl peroxides including isobutyl peroxide, benzoyl peroxide, 2,4-dichlorobenzoyl peroxide and 3,5,5-trimethylhexanoyl peroxide; peroxy diesters including t-butyl peroxypivalate, t-hexyl peroxypivalate, t-butyl peroxyneodecanoate, t-hexyl peroxyneodecanoate, 1-cyclohexyl-1-methyl ethyl peroxyneodecanoate, 1,1,3,3-tetramethyl butyl peroxyneodecanoate, cumyl peroxyneodecanoate and (á,á-bis-neodecanoyl peroxy) diisopropylbenzene; peroxy dicarbonates including bis (4-t-butyl cychlohexyl) peroxy dicarbonate, di-n-propyl-oxydicarbonate, di-isopropyl peroxy dicarbonate, di (2-ethylethyl peroxy) dicarbonate, dimethoxybutyl peroxy dicarbonate and di (3-methyl-3-methoxybutyl peroxy) dicarbonate; and azo compounds including 2,2'-azobisisobutyronitrile, 2,2'-azobis (4-methoxy-2,4-dimethylvaleronitrile), 2,2'-azobis (2,4-dimethyl valeronitrile) and 1,1'-azobis-(1-cyclohexane carbonitrile) can be cited.

The volatile expanding agent included in the microcapsule is a material that comes into its gaseous state at a temperature equal to or less than a softening point of the polymer prepared from the combined components recited above. A low-boiling organic solvent is preferably used as the volatile expanding agent. To be more specific, for example, low-molecular-weight hydrocarbons including ethane, ethylene, propane, propene, n-butane, isobutane, butene, isobutene, n-pentane, isopentane, neopentane, n-hexane, heptane and petroleum ether; chlorofluorocarbons including $CCl_3F$, $CCl_2F_2$, $CClF_3$, and $CClF_2—CCl_2F_2$; and tetraalkylsilanes including tetramethylsilane, trimethylethylsilane, trimethylisopropylsilane and trimethyl-n-propylsilane can be cited. These may be used singularly or in combination of two or more. Among them, isobutane, n-butane, n-pentane, isopentane, n-hexane, petroleum ether and a mixture of two or more of these are of preferable. If desired, a compound that is thermally decomposed into a gaseous state by heating may be used.

No particular limitation is imposed on the method of micro-encapsulating the volatile expanding agent above. The volatile expanding agent can be micro-encapsulated by any conventional procedure. A particularly preferable method is the method that polymerizable monomer and cross-linking agent are mixed with volatile expanding agent and polymerization initiator and then the mixture is suspended in an adequate aqueous dispersion medium containing a dispersion stabilizing agent and the like, for suspension polymerization, as disclosed by Japanese Patent Publication No. Sho 42(1967)-26524, for example.

Usually, the suspension polymerization is performed in an aqueous dispersion medium containing a dispersion stabilizing agent. The dispersion stabilizing agents that may be used include, for example, silica, calcium phosphate, magnesium hydroxide, aluminum hydroxide, ferric hydroxide, barium sulfate, calcium sulfate, sodium sulfate, calcium oxalate, calcium carbonate, barium carbonate and magnesium carbonate. In addition to this, an auxiliary stabilizing agent may be used, including, for example, a condensation product of diethanolamine and aliphatic dicarboxylic acid, a condensation product of urea and formaldehyde, polyvinylpyrrolidone, polyethyleneoxide, polyethyleneimine, tetramethylammonium hydroxide, gelatin, methyl cellulose, polyvinyl alcohol, dioctyl sulfosuccinate, sorbitan ester, and various kinds of emulsifying agents. The dispersion stabilizing agent is used in a proportion of 0.1–20 parts by weight per 100 parts by weight of polymerizable monomer.

The aqueous dispersion medium containing dispersion stabilizing agent is prepared by mixing the dispersion stabilizing agent and the auxiliary stabilizing agent in deionized water. The aqueous phase pH in polymerization is properly determined in accordance with the kinds of dispersion stabilizing agent and auxiliary stabilizing agent used. For example, when silica, such as colloidal silica, is used as the dispersion stabilizing agent, the polymerization is performed in an acidic environment. For acidification of the aqueous medium, an acid, such as hydrochloric acid, is added, as necessary, so that the pH of system can be adjusted to 3–4. When magnesium hydroxide or calcium phosphate is used as the dispersion stabilizing agent, the polymerization is performed in an alkaline environment.

One of the preferable combinations is the combination of colloidal silica and a condensation product. A preferable condensation product is the condensation product of diethanolamine and aliphatic dicarboxylic acid. Particularly preferable ones include the condensation product of diethanolamine and adipic acid and the condensation product of diethanolamine and itaconic acid. Further addition of an inorganic salt, such as sodium chloride or sodium sulfate makes it easier for the thermally expansive microcapsule to have further homogeneous particle forms. The amount of colloidal silica used is properly adjusted in accordance with its particle size. The colloidal silica is used in a proportion of 1–20 parts by weight, or preferably 2–10 parts by weight, per 100 parts by weight of polymerizable monomer. The condensation product is used in a proportion of 0.05–2 parts by weight per 100 parts by weight of polymerizable monomer. The inorganic salt is used in a proportion of 0–100 parts by weight per 100 parts by weight of polymerizable monomer.

Other preferable combination includes a combination of colloidal silica and an aqueous nitrogen-containing compound. Examples of the aqueous nitrogen-containing compound are polyvinylpyrrolidone, polyethyleneimine, polyoxyethylene alkylamine, polydialkylamino alkylacrylate typified by polydimethylamino ethylmethacrylate and polydimethylamino ethylacrylate, polydialkylamino alkylmethacrylate, polydialkylamino alklacrylamide typified by polydimethylamino propylacrylamide and polydimethylamino propylmethacrylamide, polydialkylamino alkylmethacrylamide, polyacrylamide, polycationic acrylamide, polyamine sulfone, and polyallylamine. Among them, colloidal silica and polyvinylpyrrolidone are preferably used in combination. Further, the other preferable combination includes a combination of magnesium hydroxide and/or calcium phosphate and an emulsifying agent.

While in the combination of colloidal silica and polyvinylpyrrolidone, the particle size can be controlled by adjusting the amount of colloidal silica and polyvinylpyrrolidone added, it is preferable that the particle size is controlled by adjusting the amount of polyvinylpyrrolidone added.

While the components can be added to the aqueous dispersion medium in no particular order, it is typical that water and the dispersion stabilizing agent, and the auxiliary stabilizing agent, if necessary, are added in a polymerizer, to prepare the aqueous dispersion medium containing the dispersion stabilizing agent. If necessary, a compound, such as alkali metal nitrite, stannous chloride, stannic chloride and potassium dichromate, is added. The polymerizable monomer and the foaming agent may be separately added to the aqueous dispersion medium, to form an oily mixture in the aqueous dispersion medium, but it is typical that both of them are previously mixed, prior to being added into the aqueous dispersion medium. The polymerization initiator may be previously added to the oily mixture, for use, but it may be added after the aqueous mixture and the oily mixture are agitated and mixed in the polymerizer. Alternatively, after the oily mixture and the aqueous mixture are mixed in a different container and then the resulting mixture and the polymerization initiator are agitated and mixed in the different container, the resulting mixture may be charged in the polymerizer.

Usually, the thermally expansive microcapsule of the present invention which is in its unexpanded state has a particle size of about 5 ìm to about 50ìm. Also, it has a volatile-expanding-agent content of about 10 weight % to about 20 weight %. The thermally expansive microcapsule that behaves an appropriate foaming according to its intended application can be produced by selecting a combination of polymerizable monomers used, controlling an amount ratio therebetween and selecting a foaming agent.

The thermally expansive microcapsule thus obtained provides a sharp particle-size distribution, an excellent heat resistance such that it cannot be foamed at temperature of not more than 140° C., and an extremely lowness in secondary cohesion when heated, to thereby produce homogenous foams.

DETAILED DESCRIPTION OF THE PREFERRED EMBODIMENTS

In the following, the present invention will be described with reference to certain examples.

EXAMPLE 1

After the oily mixture and the aqueous mixture as was prepared in accordance with the combination and prescription shown in TABLE 1 was agitated and mixed with a homogenizer, they were charged into a nitrogen-substituted pressure polymerizer (20L) and were pressurized (0.2 MPa), so that they were allowed to react at 60° C. for 20 hours. The reaction product thus obtained was filtrated, washed with water and dried to obtain a thermally expansive mitrocapsule having a mean particle size of 30 ìm and a CV value of 1.05. The CV value was determined in the following manner. First, after a particle-size distribution of the particles was measured on the basis of volume, a passing ratio (a sieving ratio) curve was found. Then, a particle size of the largest particle of all particles passing when the passing ratio was 10 percent by volume was found in the found passing ratio curve. That particle size was defined as a 10% particle size. Similarly, a particle size of the largest particle of all particles passing when the passing ratio was 90 per cent by volume was found in the found passing ratio curve. That particle size was defined as a 90% particle size. The CV value was calculated from the following equation.

$CV$ value=(90% particle size−10% particle size)/Mean particle size

The expansion ratio (volume ratio) of the obtained microcapsules was measured in various heating conditions and the secondary cohesion of the same when heated was evaluated in the following manner and the results were shown in TABLE 1.

EXAMPLE 2

The thermally expansive microcapsule was produced in the same manner as in Example 1, except that the oily mixture was prepared in accordance with the combination and prescription shown in TABLE 1. The mean particle size of the thermally expansive microcapsule thus obtained was 35 ìm and the CV value was 1.10. The obtained microcapsule was evaluated in the same manner as in Example 1 and the results were shown in TABLE 1.

EXAMPLE 3

The thermally expansive microcapsule was produced in the same manner as in Example 1, except that the oily mixture was prepared in accordance with the combination and prescription shown in TABLE 1. The mean particle size of the thermally expansive microcapsule thus obtained was 35 ìm and the CV value was 1.15. The obtained microcapsule was evaluated in the same manner as in Example 1 and the results were shown in TABLE 1.

COMPARATIVE EXAMPLE 1

The thermally expansive microcapsule was produced in the same manner as in Example 1, except that the oily mixture was prepared in accordance with the combination and prescription shown in TABLE 1. The mean particle size of the thermally expansive microcapsule thus obtained was 30 ìm and the CV value was 1.25. The obtained microcapsule was evaluated in the same manner as in Example 1 and the results were shown in TABLE 1.

COMPARATIVE EXAMPLE 2

The thermally expansive microcapsule was produced in the same manner as in Example 1, except that the oily mixture was prepared in accordance with the combination and prescription shown in TABLE 1. The mean particle size of the thermally expansive microcapsule thus obtained was 35 ìm and the CV value was 1.25. The obtained microcapsule was evaluated in the same manner as in Example 1 and the results were shown in TABLE 1.

COMPARATIVE EXAMPLE 3

The thermally expansive microcapsule was produced in the same manner as in Example 1, except that the oily mixture was prepared in accordance with the combination and prescription shown in TABLE 1. The mean particle size of the thermally expansive microcapsule thus obtained was 30 ìm and the CV value was 1.20. The obtained microcapsule was evaluated in the same manner as in Example 1 and the results were shown in TABLE 1.

Measuring Method

Foaming Ratio 1.0 g of thermally expansive microcapsule was put in a gear oven and was heated at a specified temperature (foaming temperature) for 5 minutes, to foam it. Then, the foam thus obtained was put in a graduated cylinder to measure the volume. The measured volume was divided by a volume of the micro-capsule which was in its unexpanded state, to determine the foaming ratio.

Degree of Secondary Cohesion

The state of the particles when heated at the specified temperature was observed with SEM (scanning electron microscope), to evaluate a degree of the secondary cohesion under the following judgment standard.

○: Extremely low in secondary cohesion at heating

×: High in cohesion at heating

TABLE 1

|  |  |  | Example 1 | Example 2 | Example 3 | Comparative Example 1 | Comparative Example 2 | Comparative Example 3 |
|---|---|---|---|---|---|---|---|---|
| Oily Mixture | Acrylonitrile | Parts by weight | 2,845 | 2,845 | 3,100 | 2,845 | 2,845 | 3,100 |
|  | Methyl methacrylate | Parts by weight | 465 | 465 | 210 | 465 | 465 | 210 |
|  | Dipentaerythritol hexaacrylate | Parts by weight | 5 | 10 | 5 | — | — | — |
|  | Triacrylformal | Parts by weight | — | — | — | 5 | 10 | 5 |
|  | n-pentane | Parts by weight | 640 | 640 | 640 | 640 | 640 | 640 |
|  | Azobisisobutyronitrile | Parts by weight | 17 | 17 | 17 | 17 | 17 | 17 |
| Aqueous mixture | Deionized water | Parts by weight | 7,300 | 7,300 | 7,300 | 7,300 | 7,300 | 7,300 |
|  | Silica dispersion liquid (a solid content of 20%) | Parts by weight | 1,260 | 1,260 | 1,260 | 1,260 | 1,260 | 1,260 |
|  | Potassium dichromate (2.5% aqueous solution) | Parts by weight | 45 | 45 | 45 | 45 | 45 | 45 |
|  | Polyvinylpyrrolidone | Parts by weight | 8 | 8 | 8 | 8 | 8 | 8 |
|  | Sodium chloride | Parts by weight | 2,200 | 2,200 | 2,200 | 2,200 | 2,200 | 2,200 |
|  | Hydrochloric acid | Parts by weight | 8.5 | 8.5 | 8.5 | 8.5 | 8.5 | 8.5 |
| Evaluation results | Foaming ratio | Heating temperature 120 (° C.) | 1.0 | 1.0 | 1.0 | 1.0 | 1.0 | 1.0 |
|  |  | 140 (° C.) | 1.2 | 1.0 | 1.0 | 1.5 | 1.3 | 1.0 |
|  |  | 160 (° C.) | 25 | 22 | 22 | 18 | 18 | 15 |
|  |  | 180 (° C.) | 25 | 23 | 22 | 15 | 15 | 15 |
|  | Degree of secondary cohesion (Heating temperature: 160° C.) |  | ○ | ○ | ○ | X | X | X |

What is claimed is:

1. A method of producing a thermally expansive microcapsule, wherein a polymer obtained from the component comprising not less than 80 weight % of monomer of nitrile series, less than 19.95 weight % of monomer of non-nitrile series, and 0.05–1 weight % of at least tetrafunctional cross-linking agent and/or of long side chain of cross-linking agent is used to micro-encapsulate a volatile expanding agent that comes into its gaseous state at a temperature equal to or less than a softening point of the polymer.

2. The method of producing a thermally expansive microcapsule according to claim 1, wherein the component comprises 0.1–1 weight % of the at least tetrafunctional cross-linking agent and/or of long side chain of cross-linking agent.

3. The method of producing a thermally expansive microcapsule according to claim 1, wherein the monomer of nitrile series is acrylonitrile and/or methacrylonitrile.

4. The method of producing a thermally expansive microcapsule according to claim 1, wherein the monomer of non-nitrile series is a monomer selected from the group consisting of methacrylic esters, acrylic esters, styrene and vinyl acetate.

5. The method of producing a thermally expansive microcapsule according to claim 1, wherein the cross-linking agent is at least tetrafunctional cross-linking agent selected from the group consisting of pentaerythritol tetraacrylate, pentaerythritol tetramethacrylate, dipentaerythritol hexaacrylate and dipentaerythritol hexamethacrylate or a long side chain of cross-linking agent selected from the group consisting of polyethylene glycol methacrylate of number average molecular weight of 200, polyethylene glycol dimethacrylate of number average molecular weight of 400, polyethylene glycol dimethacrylate of number average molecular weight of 600, neopenthylglycol diacrylate, 1,6-hexanediol diacrylate, 1,9-nonanediol diacrylate, dimethylol-tricyclodecane diacrylate, ethylene oxide modified trimethylolpropane triacrylate, polyethylene glycol diacrylate of number average molecular weight of 200, polyethylene glycol diacrylate of number average molecular weight of 400 and polyethylene glycol diacrylate of number average molecular weight of 600.

6. The method of producing a thermally expansive microcapsule according to claim 1, wherein the polymer is obtained from the component comprising 90–97 weight % of monomer of mixture series, 9.8–3 weight % of monomer of non-nitrile series, and 0.2–0.5 weight % of the at least tetrafunctional cross-lining agent and/or of the long side chain of cross-linking agent.

* * * * *

UNITED STATES PATENT AND TRADEMARK OFFICE
CERTIFICATE OF CORRECTION

PATENT NO. : 6,617,363 B2  Page 1 of 1
DATED : September 9, 2003
INVENTOR(S) : Ohmura et al.

It is certified that error appears in the above-identified patent and that said Letters Patent is hereby corrected as shown below:

<u>Title page,</u>
Item [*] Notice, delete "0 days" and replace with -- 22 days --.
Item [57], ABSTRACT,
Line 7, after "less than" insert -- 19.95 --.

Signed and Sealed this

Seventeenth Day of February, 2004

JON W. DUDAS
*Acting Director of the United States Patent and Trademark Office*